UNITED STATES PATENT OFFICE.

JAMES EDWIN FAIRFAX, OF AIKEN, SOUTH CAROLINA, ASSIGNOR OF TWO-THIRDS TO JOHN M. RICHARDSON, OF AIKEN, SOUTH CAROLINA.

PLASTER COMPOSITION.

1,099,739.      Specification of Letters Patent.      Patented June 9, 1914.

No Drawing.      Application filed July 9, 1913. Serial No. 778,063.

*To all whom it may concern:*

Be it known that I, JAMES E. FAIRFAX, a citizen of the United States, and a resident of Aiken, in the county of Aiken and State of South Carolina, have invented a new and Improved Plaster Composition, of which the following is a full, clear, and exact description.

My invention relates to plaster compositions, and has reference more particularly to a composition comprising substances that will make the composition work more evenly, moisture proof, hard, and hold the set.

The object of the invention is to provide an inexpensive waterproof plaster composition which can be used on wood as well as metal laths, which can be worked in any desired way, and which does not crack nor chip off.

The ingredients I use for forming this plaster composition are as follows: plaster of Paris, slaked lime, kaolin, sand, fibered hay, and Rochelle salt.

The slaked lime I use is prepared as follows: The lime in bulk is thrown into a receptacle, which may be any suitable building of any suitable material. While the lime is being thrown or shoveled into the receptacle it is sprayed with water, care being taken not to slaken the lime at once but to produce a slow slakening of the lime. The lime so sprayed is left in the receptacle for twenty-four hours; then it is ground. I have found by experience that lime slaked in this way is stronger than the ordinary and so-called air slaked lime. The sand I use is first dried and then screened; and it must be sharp and clean. The kaolin I use is in a dry and powdered form. The hay is fibered by running it through a cotton gin, but it can be fibered in any other suitable way. The decay of the fibered hay is prevented by the lime. The Rochelle salt used is finely powdered before mixing with the other ingredients.

The proportion of the ingredients stated that I prefer to use is as follows: To every one ton of my composition I use five hundred pounds of plaster of Paris, five hundred pounds of slaked lime, one hundred pounds of kaolin, eight hundred and ninety-three pounds of sand, six pounds of fibered hay and one pound of Rochelle salt. In per cent. it will be as follows: 25% of plaster of Paris, 25% of slaked lime, 5% of kaolin, 44.65% of sand, .3% of fibered hay, and .05% of Rochelle salt.

The plaster of Paris and the slaked lime help to make the composition hard. The kaolin makes the same to work more evenly and makes it moisture proof. The fibered hay is the binding element in the composition. The Rochelle salt holds the set of the composition and increases the hardness of the same.

The composition made as above described can be used on brick, stone, wood and metal laths. It has no injurious effect on metal of any kind; it spreads easily; and it can be water floated. It works well under the rod, darby and float. It does not crack or chip off. It is very firm without a superficial coat, but leaving out the sand and hay of the composition it can be used as an extra coat, forming a beautiful, hard, white finish. The extra or second coat should be put on the same day as the first coat.

Having thus described my invention, I claim as new and desire to secure by Letters Patent:

1. A plaster composition comprising ingredients substantially in proportion as follows: plaster of Paris, 25%; slaked lime, 25%; kaolin, 5%; sand, 44.65%; fibered hay, 3%; Rochelle salt, .05%.

2. A plaster composition comprising plaster of Paris and slaked lime in equal proportions mixed with kaolin, fiber, Rochelle salt and sand.

In testimony whereof I have signed my name to this specification in the presence of two subscribing witnesses.

JAMES EDWIN FAIRFAX.

Witnesses:
    J. B. SALLEY,
    GEO. W. CROFT.

Copies of this patent may be obtained for five cents each, by addressing the "Commissioner of Patents, Washington, D. C."